(No Model.)
T. A. EDISON.
PHONOGRAPH RECORDER AND REPRODUCER.
No. 400,646. Patented Apr. 2, 1889.
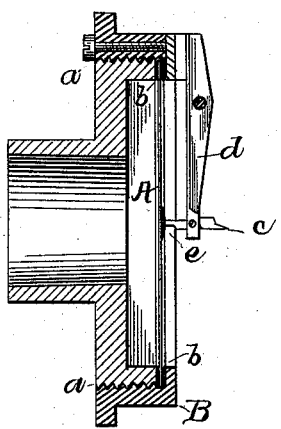
WITNESSES:
INVENTOR,
Thomas A. Edison
BY
Dyer & Seely
ATTORNEYS.

UNITED STATES PATENT OFFICE.

THOMAS A. EDISON, OF LLEWELLYN PARK, NEW JERSEY, ASSIGNOR TO THE EDISON PHONOGRAPH COMPANY, OF NEW JERSEY.

PHONOGRAPH RECORDER AND REPRODUCER.

SPECIFICATION forming part of Letters Patent No. 400,646, dated April 2, 1889.

Application filed June 7, 1888. Serial No. 276,384. (No model.)

*To all whom it may concern:*

Be it known that I, THOMAS A. EDISON, of Llewellyn Park, in the county of Essex and State of New Jersey, have invented a certain new and useful Improvement in Phonograph Recorders and Reproducers, (Case No. 775,) of which the following is a specification.

The object I have in view is to produce a perfect diaphragm for the recorders and reproducers of phonographs, one which will maintain its adjustment and give the maximum effects under varying conditions of heat and moisture due to atmospheric changes as well as to the breath of the operator in the case of a recorder.

I have found that by employing a film or membrane of glass or its equivalent porcelain as the diaphragm of the recorder or reproducer the difficulties heretofore encountered are effectively overcome. I preferably employ microscope-glass, but other varieties of glass may be employed provided it is made thin as a film or membrane, so as to be capable of a sufficient amplitude of vibration to make or reproduce a proper record. I have employed glass films or membranes for this purpose having a thickness of six one-thousandths to twelve one-thousandths part of an inch; but while the best results are obtained with glass of extreme thinness, yet thicker glass has advantages over materials heretofore employed. The glass film is cut into a circular form of proper diameter by a diamond, and is clamped between metallic rings with some yielding material—such as paper placed around the edges of the glass on both sides. The glass film or membrane diaphragm is not materially affected by ordinary variations of heat and moisture, it has great elasticity, and is highly responsive to sound-vibrations, and is capable, by reason of its extreme thinness, of sufficient amplitude of vibration to make or reproduce a deep record. Hence it does not get out of adjustment, and gives at all times the maximum effects, producing as a recorder a uniformly excellent record.

In the accompanying drawing, forming a part hereof, the figure represents a sectional view of a recorder embodying the invention.

A is the diaphragm of the recorder, which is a film or membrane of glass or its equivalent for the purpose—porcelain. This diaphragm is held at its edges in the annular frame B by a screw-ring, $a$, rings of paper $b$ being placed between the glass diaphragm and the clamping-surfaces to hold the diaphragm firmly and prevent cracking.

The recording-point $c$ is secured to a lever, $d$, and is attached to the center of the diaphragm by means of cement, $e$. The diaphragm is also equally applicable to phonograph-reproducers.

The glass or porcelain diaphragm I have found to have advantages over mica, which has heretofore been used by me, since the mica, by reason of its laminated structure, does not equal the glass in stiffness and elasticity.

It will be understood that when I refer herein to the diaphragm as of glass I mean to include porcelain as an equivalent.

What I claim is—

1. In a phonograph, the recorder or reproducer having in combination with the recording or reproducing point a diaphragm of glass, substantially as set forth.

2. In a phonograph, the recorder or reproducer having in combination with the recording or reproducing point a diaphragm of microscope-glass, substantially as set forth.

3. In a phonograph, the recorder or reproducer having in combination with the recording or reproducing point a diaphragm of glass clamped between metallic rings with rings of yielding material around the edges of the glass diaphragm, substantially as set forth.

4. In a phonograph, the recorder having in combination a glass diaphragm and a recording-point secured directly thereto by a suitable cement, substantially as set forth.

This specification signed and witnessed this 22d day of May, 1888.

THOS. A. EDISON.

Witnesses:
WILLIAM PELZER,
A. W. KIDDLE.